United States Patent
Chaffins et al.

(10) Patent No.: US 11,167,482 B2
(45) Date of Patent: Nov. 9, 2021

(54) THREE-DIMENSIONAL PRINTING

(71) Applicant: Hewlett-Packard Development Company, L.P., Spring, TX (US)

(72) Inventors: Sterling Chaffins, Corvallis, OR (US); David Tucker, Vancouver, WA (US); Kevin P. DeKam, Corvallis, OR (US); David C. Woodlock, Vancouver, WA (US); Lee Dockstader, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/047,455

(22) PCT Filed: Oct. 19, 2018

(86) PCT No.: PCT/US2018/056616
§ 371 (c)(1),
(2) Date: Oct. 14, 2020

(87) PCT Pub. No.: WO2020/081094
PCT Pub. Date: Apr. 23, 2020

(65) Prior Publication Data
US 2021/0229350 A1   Jul. 29, 2021

(51) Int. Cl.
*B29C 64/188* (2017.01)
*B29C 64/165* (2017.01)
(Continued)

(52) U.S. Cl.
CPC .......... *B29C 64/188* (2017.08); *B29C 64/153* (2017.08); *B29C 64/165* (2017.08); *B33Y 40/20* (2020.01); *C25D 5/56* (2013.01); *B29K 2105/251* (2013.01); *B33Y 10/00* (2014.12); *B33Y 30/00* (2014.12); *B33Y 70/00* (2014.12)

(58) Field of Classification Search
CPC ..... B29C 64/165; B29C 64/188; B33Y 70/00; C25D 5/56
See application file for complete search history.

(56) References Cited

U.S. PATENT DOCUMENTS

| 5,702,584 | A | 12/1997 | Goenka et al. |
| 6,363,606 | B1 * | 4/2002 | Johnson, Jr. ............ B22F 10/10 29/854 |

(Continued)

FOREIGN PATENT DOCUMENTS

| CN | 102409319 | 1/2013 |
| CN | 106903306 | 6/2017 |

(Continued)

*Primary Examiner* — Mary Lynn F Theisen
(74) *Attorney, Agent, or Firm* — Thorpe, North & Western LLP (57) ABSTRACT

The present disclosure is drawn to 3D printing kits and methods of making 3D printed articles. In one example, a 3D printing kit can include a powder bed material, a fusible fluid, and an activator fluid. The powder bed material can include polymer particles. The fusible fluid can include a radiation absorber. The fusible fluid can be to selectively apply to the powder bed material. The activator fluid can include a non-conductive electroless metal plating activator. The activator fluid can also be to selectively apply to the powder bed material.

20 Claims, 6 Drawing Sheets

(51) Int. Cl.
*B33Y 40/20* (2020.01)
*C25D 5/56* (2006.01)
*B33Y 10/00* (2015.01)
*B33Y 70/00* (2020.01)
*B29C 64/153* (2017.01)
*B33Y 30/00* (2015.01)
*B29K 105/00* (2006.01)

(56) References Cited

U.S. PATENT DOCUMENTS

| | | |
|---|---|---|
| 10,494,721 B1 * | 12/2019 | Robinson ............ C23C 18/1641 |
| 2014/0377477 A1 | 12/2014 | Ho |
| 2017/0191177 A1 | 7/2017 | Whitaker et al. |
| 2017/0210921 A1 | 7/2017 | Xu |
| 2017/0225396 A1 | 8/2017 | Tom et al. |
| 2018/0011337 A1 | 1/2018 | Park et al. |

FOREIGN PATENT DOCUMENTS

| | | | |
|---|---|---|---|
| WO | WO-2017180164 A1 | 10/2017 | |
| WO | WO-2017189306 A1 * | 11/2017 | ........... B29C 64/165 |
| WO | WO-2018083500 | 5/2018 | |

* cited by examiner

THREE-DIMENSIONAL PRINTING

BACKGROUND

Methods of three-dimensional (3D) digital printing, a type of additive manufacturing, have continued to be developed over the last few decades. However, systems for 3D printing have historically been very expensive, though those expenses have been coming down to more affordable levels recently. In general, 3D printing technology can shorten the product development cycle by allowing rapid creation of prototype models for reviewing and testing. Unfortunately, the concept has been somewhat limited with respect to commercial production capabilities because the range of materials used in 3D printing is likewise limited. Nevertheless, several commercial sectors such as aviation and the medical industry have benefitted from the ability to rapidly prototype and customize parts for customers.

DETAILED DESCRIPTION

The present disclosure describes 3D printing kits and methods of making 3D printed articles that involve applying a non-conductive electroless metal plating activator during the formation of the 3D printed articles. In some examples, a metal compound can be applied to react with the non-conductive electroless metal plating activator to selectively form conductive metal plating in the areas where the non-conductive electroless metal plating activator was applied. The 3D printing kits can include materials used in these methods. In one example, a 3D printing kit can include a powder bed material, a fusible fluid, and an activator fluid. The powder bed material can include polymer particles. The fusible fluid can include a radiation absorber, and the fusible fluid can be to selectively apply to the powder bed material. The activator fluid can include a non-conductive electroless metal plating activator, and the activator fluid can also be to selectively apply to the powder bed material. In further examples, the polymer particles can have an average particle size from about 20 μm to about 100 μm and can include nylon 6, nylon 9, nylon 11, nylon 12, nylon 66, nylon 612, polyethylene, thermoplastic polyurethane, polypropylene, polyester, polycarbonate, polyether ketone, polyacrylate, polystyrene powder, wax, or a combination thereof. In still further examples, the radiation absorber can be carbon black, a near-infrared absorbing dye, a near-infrared absorbing pigment, a tungsten bronze, a molybdenum bronze, metal nanoparticles, a conjugated polymer, or a combination thereof. In other examples, the non-conductive electroless metal plating activator can include palladium, palladium chloride, tin, stannous chloride, nickel, copper, silver, cobalt, platinum, rhodium, iridium, osmium, ruthenium, ora combination thereof. In certain examples, the 3D printing kit can also include a detailing fluid that includes a detailing agent to selectively apply to the powder bed material. In further examples, the 3D printing kit can also include a metal compound that is reactive with the electroless metal plating activator to form metallic plating when the metal compound and the electroless metal plating activator are contacted within a fluid.

In other examples, a 3D printing kit can include: a powder bed material that includes polymer particles; a fusible fluid that includes a radiation absorber to selectively apply to the powder bed material; an activator fluid that includes an electroless metal plating activator to selectively apply to the powder bed material; and a co-activator fluid that includes an electroless metal plating co-activator to selectively apply to the powder bed material. The electroless metal plating co-activator can be different than the electroless metal plating activator, e.g., the electroless metal plating activator can be palladium chloride and the electroless metal plating co-activator can be stannous chloride. In certain examples, the electroless metal plating activator can include palladium, palladium chloride, tin, stannous chloride, nickel, copper, silver, cobalt, platinum, rhodium, iridium, osmium, ruthenium, or a combination thereof. The electroless metal plating co-activator can include palladium, palladium chloride, tin, stannous chloride, nickel, copper, silver, cobalt, platinum, rhodium, iridium, osmium, ruthenium, hydrochloric acid, formaldehyde, hydrazine, hydroxylamine, borohydride, or combinations thereof. In still further examples, the 3D printing kit can include a metal compound that is reactive with the electroless metal plating activator, the electroless metal plating co-activator, or both to form metallic plating when contacted within a fluid.

The present disclosure also extends to methods of making 3D printed articles. In some examples, a method of making a 3D printed article can include iteratively applying individual build material layers of polymer particles to a powder bed. Based on a 3D object model, a fusible fluid can be selectively jetted onto individual build material layers. The fusible fluid can include a radiation absorber. An activator fluid can be jetted onto an area of the individual build material layers at a surface of the 3D printed article to form an area to be plated. The activator fluid can include an electroless metal plating activator. The powder bed can be exposed to energy to selectively fuse the polymer particles in contact with the radiation absorber at individual build material layers. In further examples, the area to be plated can be contacted with a fluid that includes a metal compound. The metal compound can react with the electroless metal plating activator to form metallic plating over the area to be plated. In another example, additional metal can be plated onto the area to be plated by galvanic plating. In one example, the 3D printed article can include a mold which includes a 3D printed base having the metallic plating applied to a surface of the 3D printed base. In another example, the 3D printed article can be included in a joint which includes a 3D printed ball or socket having the metallic plating applied to a surface of the 3D printed ball or socket. In another example, the 3D printed article includes an enclosure portion and the metallic plating is applied within the enclosure portion.

Further examples of the present disclosure can include multi-fluid kits for 3D printing. In one example, a multi-fluid kit for 3D printing can include a fusible fluid, an activator fluid, and a co-activator fluid. The fusible fluid can include water and a radiation absorber. The activator fluid can include an electroless metal plating activator. The co-activator fluid can include an electroless metal plating co-activator, where the electroless metal plating co-activator is different than the electroless metal plating activator. In another example, the electroless metal plating activator can include palladium, palladium chloride, tin, stannous chloride, nickel, copper, silver, cobalt, platinum, rhodium, iridium, osmium, ruthenium, or combination thereof, and the electroless metal plating co-activator can include palladium, palladium chloride, tin, stannous chloride, nickel, copper, silver, cobalt, platinum, rhodium, iridium, osmium, ruthenium, hydrochloric acid, formaldehyde, hydrazine, hydroxylamine, borohydride, or a combination thereof. In other examples, the radiation absorber can be carbon black, a near-infrared absorbing dye, a near-infrared absorbing pigment, a tungsten bronze, a molybdenum bronze, metal nanoparticles, a conjugated polymer, or a combination thereof. In still further examples, the multi-fluid kit can include a detailing fluid that includes a detailing agent. In additional examples, the multi-fluid kit can include an electroless plating solution that includes a metal compound that is reactive with the electroless metal plating activator to form metallic plating when the metal compound and the electroless metal plating activator are contacted within a fluid.

The 3D printing methods and kits described herein can allow for 3D printing articles from polymeric build material, and then adding conductive metal plating on specifically selected areas of the article. Metal plating on plastic parts can often be useful for mechanical, electrical, or aesthetic purposes. However, many methods of metal plating are expensive and time-consuming processes with multiple steps and chemistries. Furthermore, it can be very difficult to pattern metal plated designs onto conformally intricate parts using many existing masking methods. The methods describe herein can allow for selectively metal plating any desired design onto a surface of a 3D article, without being limited by the complexity of the surface of the article.

Some existing processes for electroless metal plating involve applying multiple chemical agents to an object to form a metal coating. For example, in some processes the object can be immersed in an activator solution, then rinsed, then immersed in a coactivator solution, then rinsed again, and then immersed in a final plating solution that includes a metal compound that reacts with the activator and co-activator to form a metal coating. This process can plate a metal coating on the entire surface of the object. However, this process involves several steps and chemical compositions, and the process does not allow for selectively plating metal to form customized metal patterns on the object unless masking is used.

In the methods described herein, an activator (and co-activator, if used) can be incorporated into a 3D printed article itself by applying the activator during the 3D printing process. Thus, the activator can be applied selectively to any desired locations on the 3D printed article. After 3D printing of the article is complete, a metal compound can be applied to the article to react with the activator and form metal plating on the areas where the activator was applied. For example, the entire article can be immersed in an electroless metal plating solution and the metal will selectively plate onto the areas where the activator is present.

The methods described herein can be used to form metal plated patterns with any desired shape on any three-dimensional part. If desired, a galvanic plating process can then be used to deposit a thicker layer of metal or a different type of metal onto the electroless plated patterns. In various examples, the metal plating can be used to form electric traces, electric contacts, soldering pads, high-strength parts, smooth or low-friction parts, hydrophilic surfaces, chemically durable surfaces, chemical attachment points for a variety of functional groups, and other applications. In certain examples, forming a metal plated layer on the 3D printed article can be useful for making custom injection molds. The 3D printing process can allow for a custom-shaped mold to be made quickly and inexpensively, while the smooth metal-plated surface can have better release properties than the sometimes rough surface of a 3D printed part. In further examples, metal plating can be used to provide electrostatic discharge in systems that are sensitive to static electricity. Parts that may collect static electricity can be formed using the present methods to have a metal plated surface that can be grounded, for example, to safely discharge static electricity. In still further examples, a meltable or soluble polymer build material can be used in the methods described herein. A customized metal plated pattern can be formed on surfaces of the 3D printed article, and then the polymeric material can be removed by melting or dissolving, leaving behind a thin, intricate metal part. The methods described herein can be particularly useful for all of these applications, as well as others.

Methods of Making 3D Printed Articles

In various examples, the 3D printed articles described herein can be formed from a polymer powder build material using a process that involves jetting a fusible fluid onto layers of the polymer powder and then fusing the powder using electromagnetic energy. An activator fluid can also be jetted on selected areas of the individual layers. Thus, the activator for electroless metal plating can be incorporated into the fused polymer forming a polymer/activator composite in areas to be plated with metal. In other examples, the activator fluid can be jetted onto a fused layer after fusing the polymer powder. A metal compound that reacts with the activator can then be applied to the areas to selectively form metal plating in those areas.

Figure 1:
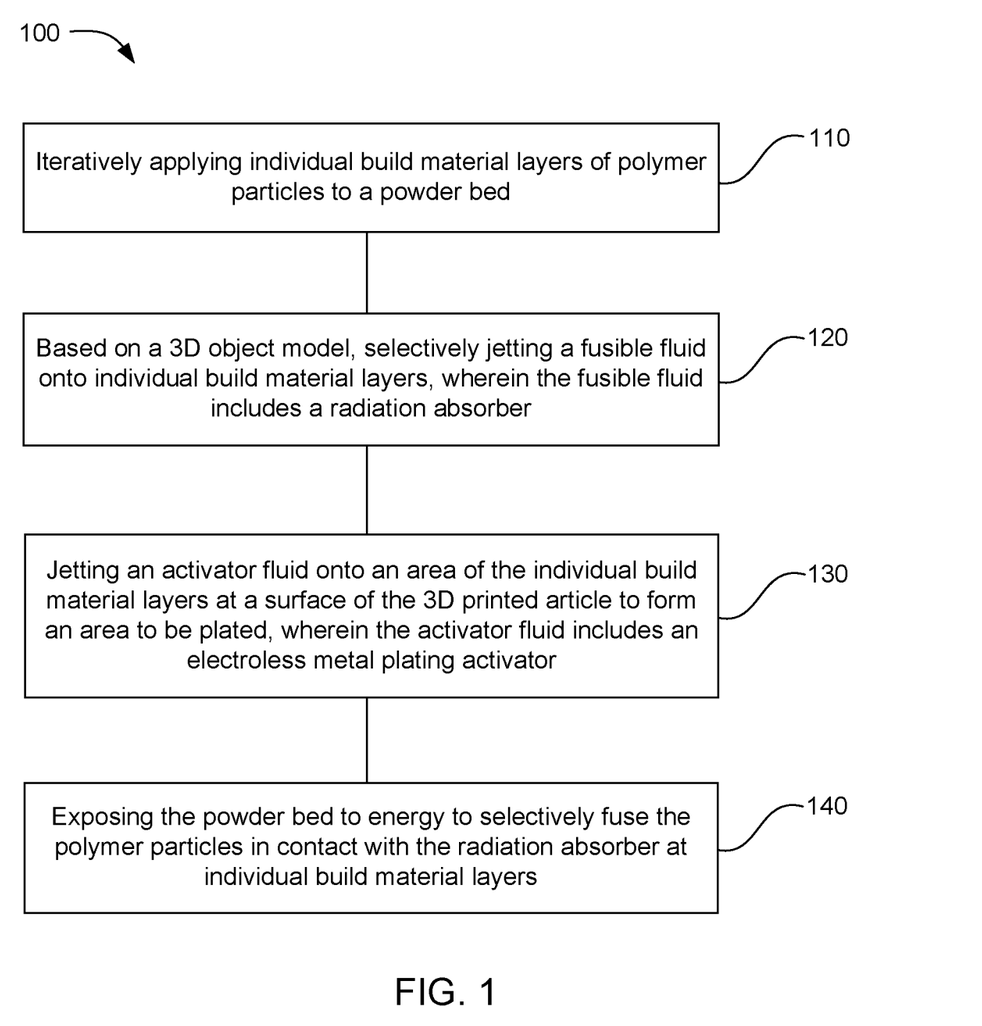
FIG. 1 is a flowchart illustrating a method of making a 3D printed article in accordance with the present disclosure.

FIG. 1 is a flowchart illustrating one example method 100 of making a 3D printed article. The method includes iteratively applying 110 individual build material layers of polymer particles to a powder bed; based on a 3D object model, selectively jetting 120 a fusible fluid onto individual build material layers, wherein the fusible fluid includes a radiation absorber; jetting 130 an activator fluid onto an area of the individual build material layers at a surface of the 3D printed article to form an area to be plated, wherein the activator fluid includes an electroless metal plating activator; and exposing 140 the powder bed to energy to selectively fuse the polymer particles in contact with the radiation absorber at individual build material layers.

A variety of activator chemistries can be used for electroless plating of different metals. As used herein, "electroless metal plating activator" can refer to any chemical that can be applied to the 3D printed article in preparation for the electroless metal plating procedure, in which a metal compound reacts with the activator to form metal plating on the 3D printed article. For some types of metal, the electroless plating process can use two separate chemicals to prepare the article for plating. In these examples, the first chemical can be referred to as the activator and the second chemical can be a co-activator. In some examples, the activator and co-activator can be applied in any order. In certain examples, the activator can be a catalyst or a reducing agent. In further examples, the co-activator can be a reducing agent or a sensitizer. In still further examples, the activator or co-activator may be referred to as an accelerator.

In a particular example, the electroless metal plating activator can be palladium chloride and the co-activator can be stannous chloride. In this example, the stannous chloride can be referred to as a sensitizer and as a reducing agent. The chemistry of this example may not be entirely understood, but in some cases the stannous chloride may reduce the palladium chloride to form palladium metal active sites on the surface of the 3D printed article to facilitate the deposition of copper metal. The palladium can act as a catalyst to initiate the deposition of copper. Besides this example, in other examples a variety of other combinations of activator and/or co-activator may be applied to the 3D printed article to plate other metals.

As mentioned above, the 3D printed article can be formed by jetting a fusible fluid onto layers of powder bed build material according to a 3D object model. 3D object models can in some examples be created using computer aided design (CAD) software. 3D object models can be stored in any suitable file format. In some examples, a 3D printed article as described herein can be based on a single 3D object model. The 3D object model can define the three-dimensional shape of the article and the three-dimensional shape of the area to be plated, where the activator fluid and co-activator fluid are to be printed. In other examples, the article can be defined by a first 3D object model and the area to be plated can be defined by a second 3D object model. Other information may also be included, such as structures to be formed of additional different materials or color data for printing the article with various colors at different locations on the article. The 3D object model may also include features or materials specifically related to jetting fluids on layers of powder bed material, such as the desired amount of fluid to be applied to a given area. This information may be in the form of a droplet saturation, for example, which can instruct a 3D printing system to jet a certain number of droplets of fluid into a specific area. This can allow the 3D printing system to finely control radiation absorption, cooling, color saturation, concentration of activator and co-activator, and so on. All this information can be contained in a single 3D object file or a combination of multiple files. The 3D printed article can be made based on the 3D object model. As used herein, "based on the 3D object model" can refer to printing using a single 3D object model file or a combination of multiple 3D object models that together define the article. In certain examples, software can be used to convert a 3D object model to instructions for a 3D printer to form the article by building up individual layers of build material.

In an example of the 3D printing process, a thin layer of polymer powder can be spread on a bed to form a powder bed. At the beginning of the process, the powder bed can be empty because no polymer particles have been spread at that point. For the first layer, the polymer particles can be spread onto an empty build platform. The build platform can be a flat surface made of a material sufficient to withstand the heating conditions of the 3D printing process, such as a metal. Thus, "applying individual build material layers of polymer particles to a powder bed" includes spreading polymer particles onto the empty build platform for the first layer. In other examples, a number of initial layers of polymer powder can be spread before the printing begins. These "blank" layers of powder bed material can in some examples number from about 10 to about 500, from about 10 to about 200, or from about 10 to about 100. In some cases, spreading multiple layers of powder before beginning the print can increase temperature uniformity of the 3D printed article. A printing head, such as an inkjet print head, can then be used to print a fusible fluid including a radiation absorber over portions of the powder bed corresponding to a thin layer of the 3D article to be formed. Then the bed can be exposed to electromagnetic energy, e.g., typically the entire bed. The electromagnetic energy can include light, infrared radiation, and so on. The radiation absorber can absorb more energy from the electromagnetic energy than the unprinted powder. The absorbed light energy can be converted to thermal energy, causing the printed portions of the powder to soften and fuse together into a formed layer. After the first layer is formed, a new thin layer of polymer powder can be spread over the powder bed and the process can be repeated to form additional layers until a complete 3D article is printed. Thus, "applying individual build material layers of polymer particles to a powder bed" also includes spreading layers of polymer particles over the loose particles and fused layers beneath the new layer of polymer particles.

In some examples, a detailing fluid can be used together with the fusing fluid. The detailing fluid can be a fluid that reduces the maximum temperature of the polymer powder on which the detailing fluid is printed. In particular, the maximum temperature reached by the powder during exposure to electromagnetic energy can be less in the areas where the detailing fluid is applied. In certain examples, the detailing fluid can include a solvent that evaporates from the polymer powder to evaporatively cool the polymer powder. The detailing fluid can be printed in areas of the powder bed where fusing is not desired. In particular examples, the detailing fluid can be printed along the edges of areas where the fusing fluid is printed. This can give the fused layer a clean, defined edge where the fused polymer particles end and the adjacent polymer particles remain unfused. In other examples, the detailing fluid can be printed in the same area where the fusible fluid is printed to control the temperature of the area to be fused. In certain examples, some areas to be fused can tend to overheat, especially in central areas of large fused sections. To control the temperature and avoid overheating (which can lead to melting and slumping of the build material), the detailing fluid can be applied to these areas.

Figure 2:
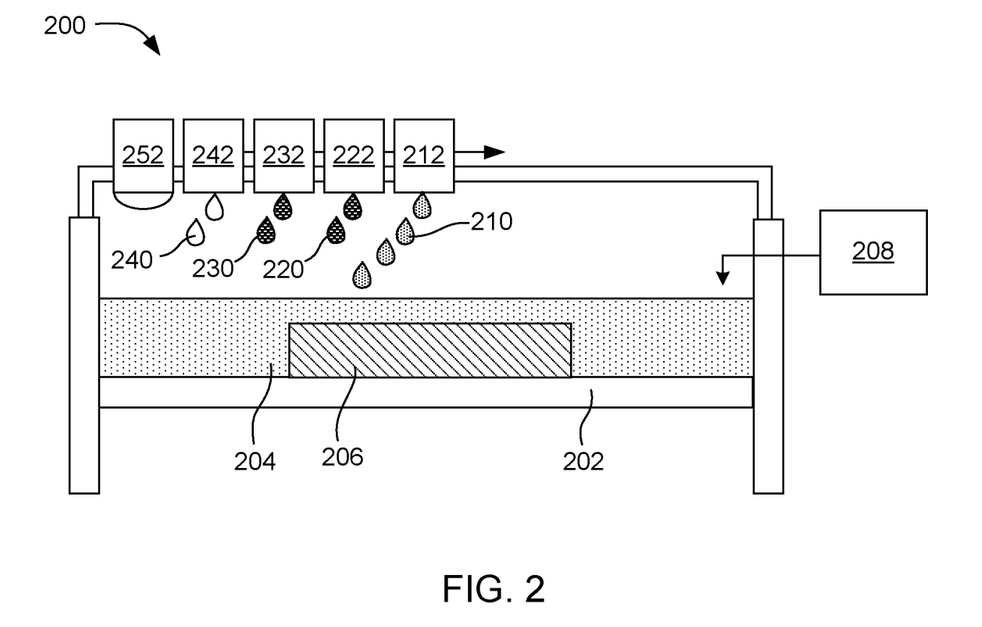
FIG. 2 is a schematic view of an example 3D printing system in accordance with the present disclosure.

FIGS. 2-6 illustrate one example method of making a 3D printed article. FIG. 2 shows a 3D printing system 200 that includes a build platform 202 supporting a powder bed of build material powder 204. A partially printed article 206 is made up of fused build material powder in the powder bed. This figure shows a cross-sectional view of the partially printed article and the powder bed. A layer of fresh build material powder is supplied from a build material supply 208 over the top of the partially printed article. Fluids are applied to the layer of fresh build material, including fusible fluid 210 from a fusible fluid jet 212, an activator fluid 220 from an activator fluid jet 222, a co-activator fluid 230 from a co-activator fluid jet 232, and a detailing fluid 240 from a detailing fluid jet 242. The fluid jets are moveable within the printing system so that the fluid jets can move across the powder bed to apply the fluids in specific, desired locations. The system also includes an electromagnetic energy source 252.

Figure 3:
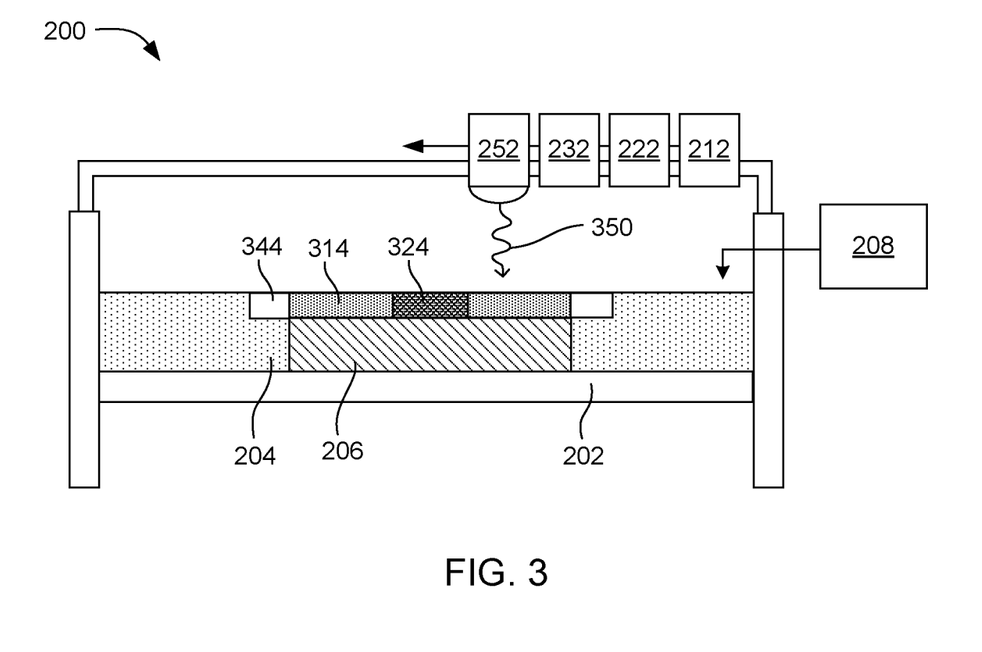
FIG. 3 is another schematic view of the example 3D printing system in accordance with the present disclosure.

FIG. 3 shows the 3D printing system 200 after the fluids have been jetted onto portions of the fresh build material powder 204. The top layer of build material now includes areas jetted with detailing fluid 344, areas jetted with fusible fluid 314, and areas jetted with activator fluid and co-activator fluid 324. In some cases, the fusible fluid can be jetted in all areas where the polymer powder is to be fused to form a solid material. In these cases, both the fusible fluid and the activator and co-activator fluids can be jetted in areas that are to form the area to be metal plated. In other cases, the activator fluid and/or co-activator fluid may act as a radiation absorber so that the activator and co-activator fluids can be printed without the fusible fluid and the activator/co-activator fluids themselves can facilitate fusing of the polymer powder in those areas. The powder bed can be exposed to electromagnetic energy 350 from an energy source 252, such as an infrared lamp.

Figure 4:
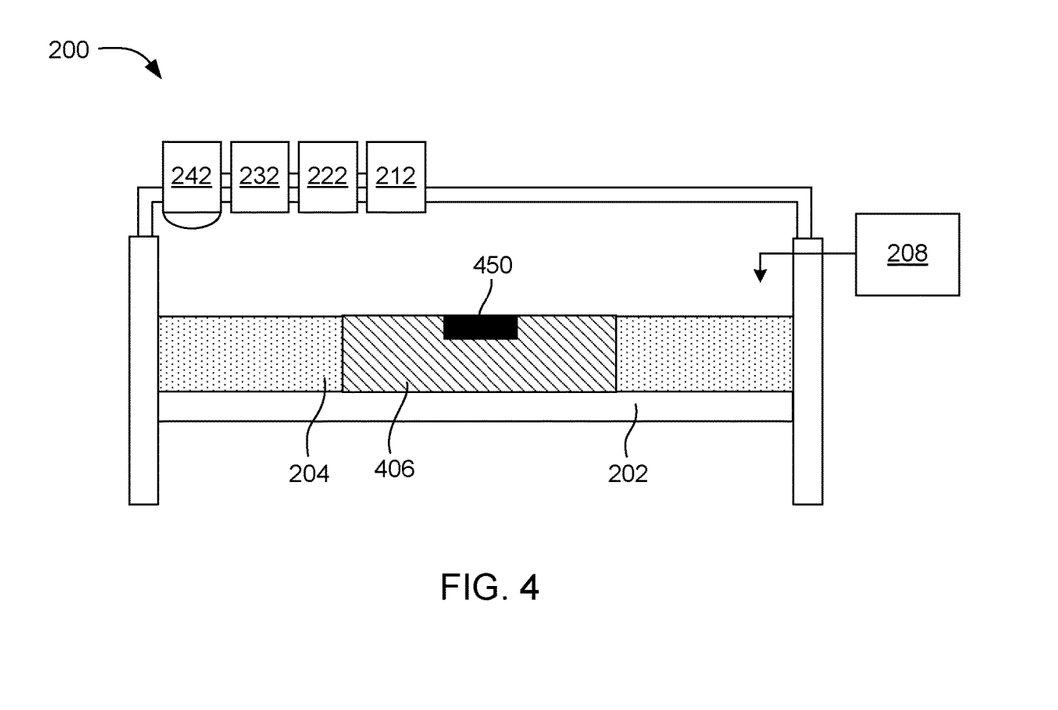
FIG. 4 is yet another schematic view of the example 3D printing system in accordance with the present disclosure.

FIG. 4 shows the 3D printing system 200 after fusing the top layer to form a surface layer and complete a 3D printed article 406. The surface layer includes an area to be plated 450 as a part of the top layer. The area to be plated includes a composite made up of the activator and co-activator fused with polymer particles. Because the area to be plated is at a surface of the 3D printed article, the area to be plated can be electrolessly plated by immersing the 3D printed article in an electroless metal plating solution.

Figure 5:
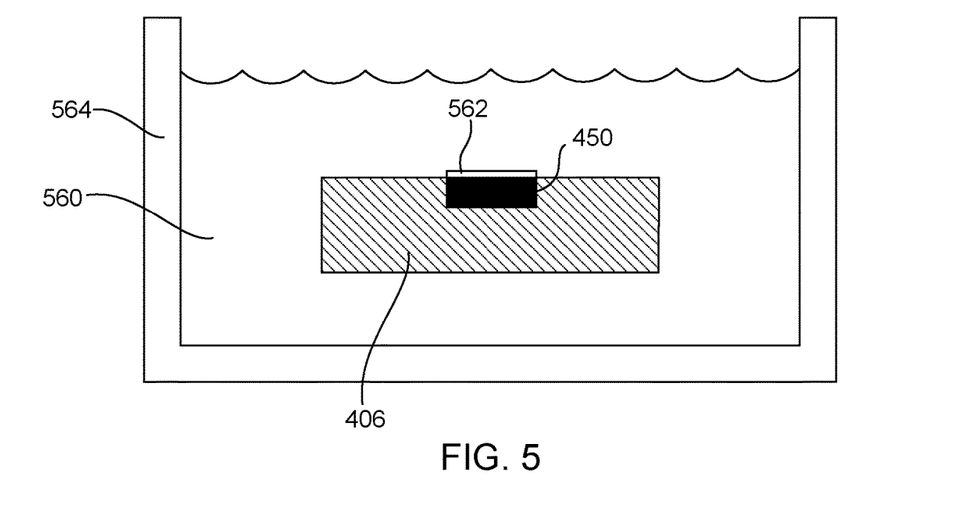
FIG. 5 is a schematic view of an example 3D printed article in an electroless metal plating solution in accordance with the present disclosure.

FIG. 5 shows the 3D printed article 406 immersed in an electroless metal plating solution 560 that includes a metal compound to react with the activator and co-activator and forming metallic plating 562 on the area to be plated 450. The electroless metal plating solution is contained in a bath enclosure 564. Because the plating process is electroless, no electric current is applied during this process. The metal compound in the solution reacts with the activator and co-activator to deposit a layer of metal on the area to be plated. In some cases, "reacts with the activator and co-activator" can include reacting with the activator, reacting with the co-activator, reacting in a reaction that involves all three of the metal compound, the activator, and the co-activator, or reacting in a reaction that involves any combination of the metal compound, the activator, the co-activator, and other chemical compounds that may be present such as other compounds in the electroless metal plating solution. In further examples, the activator and co-activator may react with each other to form a reaction product in the area to be plated, and that reaction product can react with the metal compound to deposit the metal plating. In various examples, the reactions can include reactions that consume the metal compound, activator, and co-activator, reactions that are catalyzed by the activator or co-activator, or any combination thereof.

Figure 6:
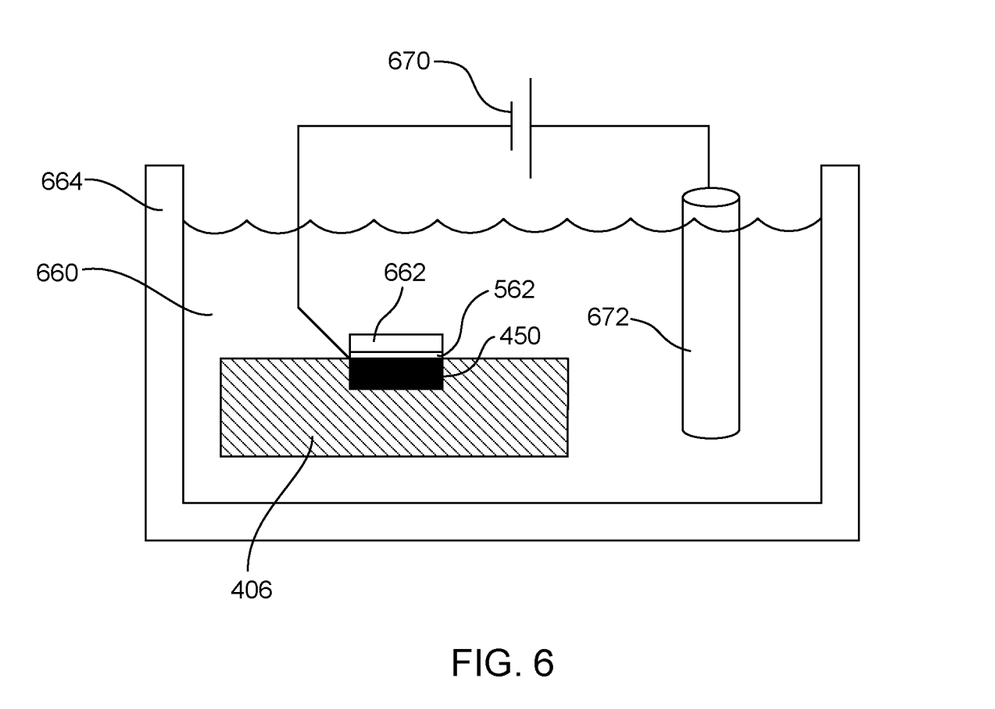
FIG. 6 is a schematic view of the example 3D printed article in a galvanic plating bath in accordance with the present disclosure.

As mentioned above, in some examples additional metal can be added to the metal plating by using a galvanic plating process after the electroless plating process. FIG. 6 shows the 3D printed article 406 in a galvanic plating bath enclosure 664 containing an electrolyte solution 660. A power source 670 is connected to apply an electric voltage to an anode 672 and the electroless metallic plating 562. This results in the deposition of a thicker layer of galvanic plating 662 on top of the electroless metal plating.

Selectively metal plating portions of 3D printed articles can have a wide variety of applications. In some examples, the metal plating can be added to make the surface of the 3D printed article stronger, more chemically resistant, smoother, and so on. In certain examples, the metal plated surface can reduce friction. This can be useful in 3D printed molds, where a smooth, low friction surface can be used to release the molded object from the mold. Low friction surfaces can also be useful for moving mechanical parts, such as bearings or joints. In one example, a ball joint or socket for a ball joint can be 3D printed and metal plating can be applied to the surfaces where the ball and socket contact one another.

Figure 7:
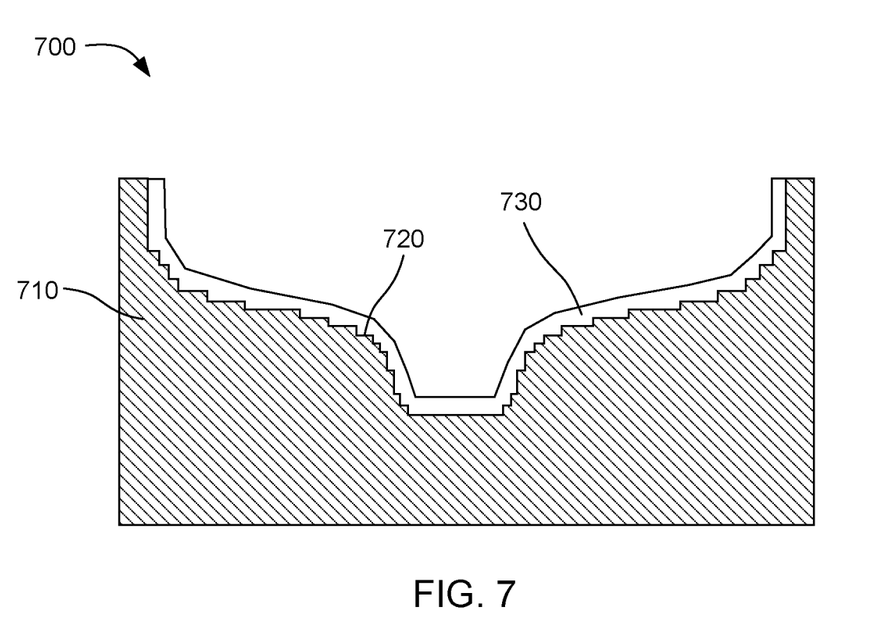
FIG. 7 is a cross-sectional view of another example 3D printed article in accordance with the present disclosure.

FIG. 7 shows an example 3D printed mold 700. The mold includes a 3D printed base 710. The 3D printed base has a somewhat rough surface 720, which can be common with 3D printed articles. A metal plating coating 730 has been selectively applied to the surface of the mold where the molded article is released. This coating has a smoother and lower-friction surface than the 3D printed base surface. The metal plating coating can be made by electroless plating or by the combination of electroless plating followed by galvanic plating, as described above.

Figure 8:
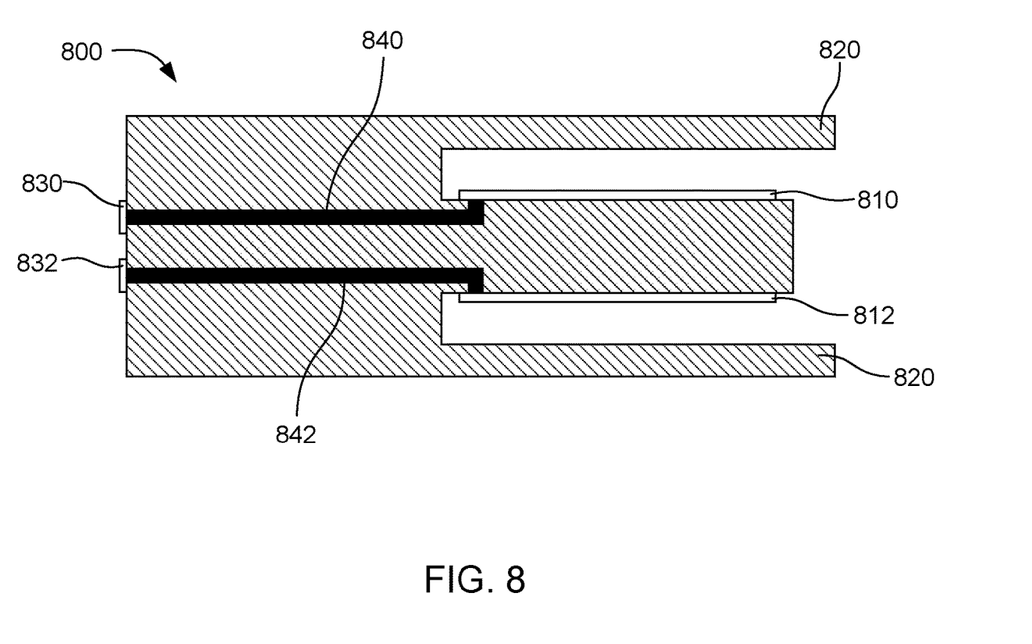
FIG. 8 is a cross-sectional view of yet another example 3D printed article in accordance with the present disclosure.

In further examples, electrically conductive metal plated patterns can be added to 3D printed articles for use as conductive traces, soldering pads, or other electrically conductive components. FIG. 8 shows an example 3D printed article 800 that includes electric contacts 810, 812 formed by the metal plating processes described herein. The electric contacts are located inside an enclosure portion 820 of the 3D printed article. The enclosure (a cross-section of which is shown) may wrap around the sides of the 3D printed article to protect the electric contacts inside. Thus, by applying the metal plating as described herein, areas that may be otherwise difficult to reach can be plated within such an enclosure portion, defined as a portion in an area that is partially enclosed, but which can still be reached by fluids suitable for electroless plating processes. Because of the location of the electrical contacts, these electrical contacts would be difficult to form by previous methods of metal plating. However, using the methods described herein, the electrical contacts can be easily formed by jetting an activator fluid in the appropriate areas to be plated and then contacting the areas to be plated with a metal compound to react with the activator and form the metal plating. This example also includes solder pads 830, 832 that can be formed using the same metal plating methods. The solder pads are connected to the electric contacts by conductive vias 840, 842 through the 3D printed article. This 3D printed article may be used as, for example, a plug for a data cable or charging cable. Accordingly, electrical signals or current can be conducted from the soldering pads, through the conductive vias, and to the electric contacts. The vias in this example can be formed by using a conductive fluid during 3D printing. For example, a fluid that includes conductive particles can be jetted onto layers of polymer powder in the appropriate places to form the conductive vias. If a sufficient concentration of conductive particles is jetted on the polymer powder, then the composite formed by fusing the polymer powder with the conductive particles can also be conductive.

Metal plated patterns can also be added to 3D printed articles for the purpose of electrostatic discharge. In some examples, a 3D printed article can be a part for use in a system that is sensitive to static electricity. For example, the part may be involved in handling or processing a flammable material. Some flammable gases and liquids can be ignited by stray sparks caused by electric discharge. Additionally, in dry material processing dust in the air can sometimes be an explosion hazard, which can be ignited by a spark. Sensitive electronic equipment such as processors can also be damaged by electric discharge. In such sensitive systems, a 3D printed part may include metal plating that can be connected to a ground wire or similar component to safely discharge static electricity from the system. This can allow the 3D printed part to be used in systems where a fully polymeric 3D printed part would create hazardous buildup of static electricity.

In further example applications of the present methods, 3D printed articles can be made with metal plated patterns for the purpose of modifying a surface of the article to be hydrophilic (whereas many polymer build materials can be hydrophobic), or to create attachment points for functional groups. In certain examples, a metal plated pattern can be formed on a 3D printed article made from a removable polymer material. The removable polymer material can have a low melting point or a solubility in a particular solvent that allows the polymer material to be removed from the metal plated pattern. After removing the polymer material, the metal plated pattern can be left behind as a standalone metal part. In some examples, intricate metal parts can be formed in this way. In certain examples, the metal part can include thin-walled tubes, high-surface-area heatsinks, heat exchangers, and many other types of metal parts.

As mentioned above, individual layers of the 3D printed article can be formed by fusing the polymer powder build material. A fusible fluid can be applied to the polymer powder in areas to be fused, while a detailing fluid can be applied to areas to be cooled. The activator fluid and co-activator fluid can also be applied to form the area to be plated. These fluids are described in more detail below. 3D printing systems used to perform these printing methods can include an electromagnetic energy source to apply electromagnetic energy to fuse the polymer powder printed with the fusible fluid. In some cases, the energy source can be a lamp such as an infrared lamp.

Suitable fusing lamps for use in the 3D printing system can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to fuse each printed layer. The fusing lamp can be configured to irradiate the entire powder bed with a substantially uniform amount of energy. This can selectively fuse the portions printed with the fusible fluid while leaving the unprinted portions of the polymer powder below the fusing temperature.

In one example, the fusing lamp can be matched with the radiation absorber in the fusible fluid so that the source emits wavelengths of light that match the peak absorption wavelengths of the radiation absorber. A radiation absorber with a narrow peak at a particular near-infrared wavelength can be used with an electromagnetic radiation fusing source that emits a narrow range of wavelengths at approximately the peak wavelength of the fusing agent. Similarly, a radiation absorber that absorbs a broad range of near-infrared wavelengths can be used with an electromagnetic radiation fusing source that emits a broad range of wavelengths. Matching the radiation absorber and the electromagnetic radiation fusing source in this way can increase the efficiency of fusing the polymer particles with the fusing agent printed thereon, while the unprinted polymer particles do not absorb as much light and remain at a lower temperature.

In some examples, the three-dimensional printing system can also include preheaters for preheating the polymer powder to a temperature near the fusing temperature. In one example, the system can include a print bed heater to heat the print bed during printing. The preheat temperature used can depend on the type of polymer used. In some examples, the print bed heater can heat the print bed to a temperature from about 50° C. to about 250° C. The system can also include a supply bed, where polymer particles can be stored before being spread in a layer onto the print bed. The supply bed can have a supply bed heater. In some examples, the supply bed heater can heat the supply bed to a temperature from about 80° C. to about 140° C.

Depending on the amount of radiation absorber present in the polymer powder, the absorbance of the radiation absorber, the preheat temperature, and the fusing temperature of the polymer, an appropriate amount of irradiation can be supplied from the electromagnetic energy source or fusing lamp. In some examples, the fusing lamp can irradiate each layer from about 0.1 to about 10 seconds per pass. In further examples, the fusing lamp can move across the powder bed at a rate of about 1 inch per second to about 60 inches per second to fuse each layer. In still further examples, the fusing lamp can move across the powder bed at a rate of about 5 inches per second to about 20 inches per second.

3D Printing Kits

Figure 9:
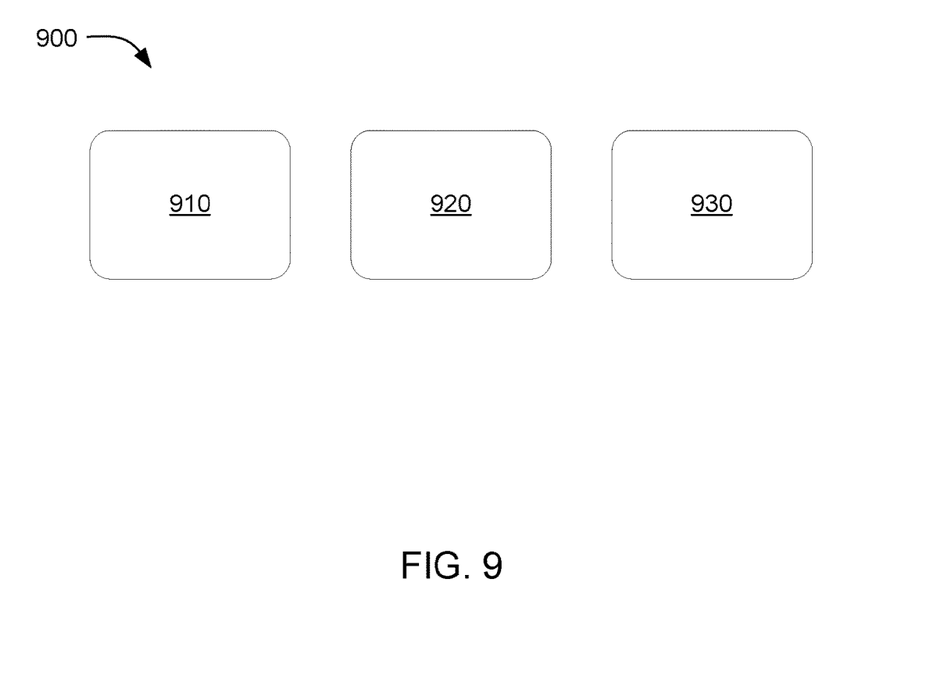
FIG. 9 is a schematic view of an example 3D printing kit in accordance with the present disclosure.

The present disclosure also extends to 3D printing kits that can include the fluids and build material used to perform the 3D printing methods described above. FIG. 9 shows an example 3D printing kit 900 that includes a powder bed material 910, a fusible fluid 920, and an activator fluid 930. The powder bed material can include polymer particles, as described above. In some examples, the fusible fluid can include water and a radiation absorber. The activator fluid can include a non-conductive electroless metal plating activator to selectively apply to the powder bed material. These materials can be used in 3D printing methods and systems as described above to form 3D printed articles with electroless metallic plating. In particular, the fusible fluid and the activator fluid can be selectively applied to the powder bed material and layers of the powder bed material can be fused to form a 3D printed article. In further examples, the 3D printing kit can also include a detailing fluid. The detailing fluid can include a detailing agent. The detailing agent can be capable of reducing the maximum temperature of polymer powder onto which the detailing fluid is applied. In certain examples, the 3D printing kit can also include a metal compound that is reactive with the electroless metal plating activator to form metallic plating when the metal compound and the electroless metal plating activator are contacted within a fluid. In some cases, the metal compound can be in an electroless metal plating solution that is included with the kit. The 3D printed article can be dipped in the electroless metal plating solution to plate metal on the areas where the activator fluid was printed, or the electroless metal plating solution can be otherwise applied to the area to be plated. In further examples, the 3D printing kit can include materials for galvanic plating. Galvanic plating can be used to add more metal to the electroless metal plating.

In some examples, the 3D printing kit can include powder bed material, a fusible fluid, and an activator fluid packaged together. In certain examples, the powder bed material can be in the form of a container or bag of loose powder material. In other examples, the powder bed material can be in a cartridge designed to fit in a specific 3D printing system. Similarly, the fusible fluid and activator fluid can be in cartridges designed for use with a specific 3D printing system, or the fluids can be in another package such as bottles.

Figure 10:
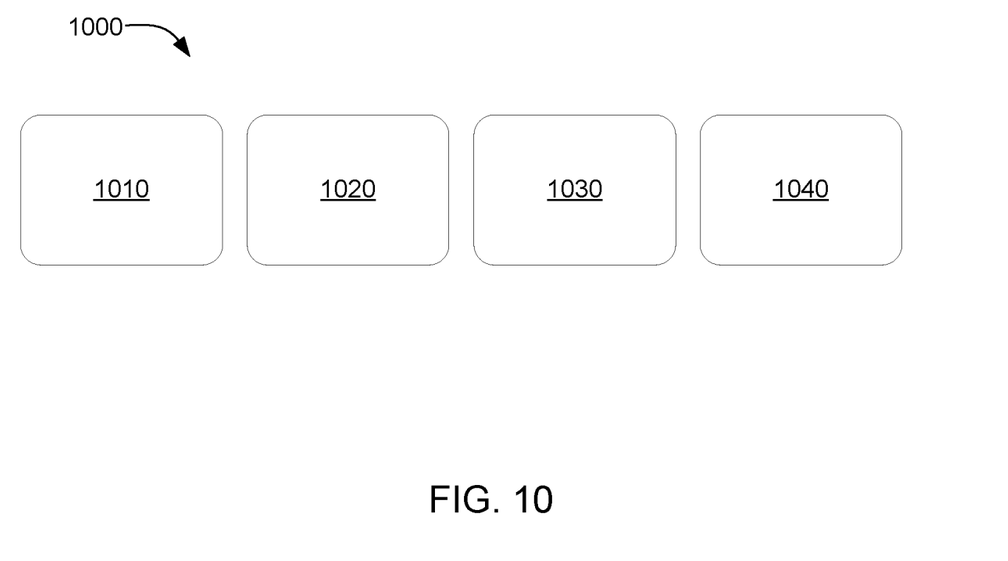
FIG. 10 is a schematic view of another example 3D printing kit in accordance with the present disclosure.

FIG. 10 shows another example 3D printing kit 1000 including a powder bed material 1010, a fusible fluid 1020, an activator fluid 1030, and a co-activator fluid 1040. The co-activator fluid can include an electroless metal plating co-activator to selectively apply to the powder bed. The electroless metal co-activator can be different than the electroless metal activator. The kits can include a powder bed material, fusible fluid, activator fluid, and co-activator packaged together as described above. In some examples, the kits can also include a detailing fluid, a metal compound for reacting with the activator and co-activator to form plating, and materials for galvanic plating.

Powder Bed Materials

In certain examples, the powder bed material can include polymer particles having a variety of shapes, such as substantially spherical particles or irregularly-shaped particles. In some examples, the polymer powder can be capable of being formed into 3D printed parts with a resolution of about 20 μm to about 100 μm, about 30 μm to about 90 μm, or about 40 μm to about 80 μm. As used herein, "resolution" refers to the size of the smallest feature that can be formed on a 3D printed part. The polymer powder can form layers from about 20 μm to about 100 μm thick, allowing the fused layers of the printed part to have roughly the same thickness. This can provide a resolution in the z-axis (i.e., depth) direction of about 20 μm to about 100 μm. The polymer powder can also have a sufficiently small particle size and sufficiently regular particle shape to provide about 20 μm to about 100 μm resolution along the x-axis and y-axis (i.e., the axes parallel to the top surface of the powder bed). For example, the polymer powder can have an average particle size from about 20 μm to about 100 μm. In other examples, the average particle size can be from about 20 μm to about 50 μm. Other resolutions along these axes can be from about 30 μm to about 90 μm, or from 40 μm to about 80 μm.

The thermoplastic polymer powder can have a melting or softening point from about 70° C. to about 350° C. In further examples, the polymer can have a melting or softening point from about 150° C. to about 200° C. A variety of thermoplastic polymers with melting points or softening points in these ranges can be used. For example, the polymer powder can be nylon 6 powder, nylon 9 powder, nylon 11 powder, nylon 12 powder, nylon 66 powder, nylon 612 powder, polyethylene powder, wax, thermoplastic polyurethane powder, acrylonitrile butadiene styrene powder, amorphous polyamide powder, polymethylmethacrylate powder, ethylene-vinyl acetate powder, polyarylate powder, silicone rubber, polypropylene powder, polyester powder, polycarbonate powder, copolymers of polycarbonate with acrylonitrile butadiene styrene, copolymers of polycarbonate with polyethylene terephthalate polyether ketone powder, polyacrylate powder, polystyrene powder, or mixtures thereof. In a specific example, the polymer powder can be nylon 12, which can have a melting point from about 175° C. to about 200° C. In another specific example, the polymer powder can be thermoplastic polyurethane.

The thermoplastic polymer particles can also in some cases be blended with a filler. The filler can include inorganic particles such as alumina, silica, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer particles to filler particles can be from about 10:1 to about 1:2 or from about 5:2 to about 1:1.

Fusible Fluids

In further examples, the fusible fluid can include a radiation absorber that is capable of absorbing electromagnetic radiation to produce heat. The radiation absorber can be colored or colorless. In various examples, the radiation absorber can be glass fiber, titanium dioxide, clay, mica, talc, barium sulfate, calcium carbonate, a near-infrared absorbing dye, a near-infrared absorbing pigment, a dispersant, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, the fusing agent can be a near-infrared absorbing conjugated polymer such as poly(3,4-ethylenedioxythiophene)-poly (styrenesulfonate) (PEDOT:PSS), a polythiophene, poly(p-phenylene sulfide), a polyaniline, a poly(pyrrole), a poly (acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

A dispersant can be included in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctyl-phenyl ether, sodium polyacrylate, and combinations thereof.

The amount of radiation absorber in the fusible fluid can vary depending on the type of radiation absorber. In some examples, the concentration of radiation absorber in the fusible fluid can be from about 0.1 wt % to about 20 wt %. In one example, the concentration of radiation absorber in the fusible fluid can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusible fluid such that after the fusible fluid is printed onto the polymer powder, the amount of radiation absorber in the polymer powder can be from about 0.0003 wt % to about 10 wt %, or from about 0.005 wt % to about 5 wt %, with respect to the weight of the polymer powder.

Activator Fluids

In some examples, the 3D printing kit can include an activator fluid that includes a non-conductive electroless metal plating activator to selectively apply to the powder bed material. In some cases, the electroless metal plating activator can include metal atoms. However, the electroless metal plating activator used in the activator fluid is non-conductive. Accordingly, metal atoms in the activator fluid can be in a compound that is non-conductive. In some examples the activator can be devoid of conductive metal, such as metal particles.

A variety of activators may be used in electroless plating processes, depending on the type of metal being plated. Electroless plating processes often involve dipping a part in a solution of activator and then dipping the part in an electroless metal plating solution to form the metal plating on the surface of the part. In some examples, the activator fluid used in the 3D printing methods described herein can be the same as the activator solution of such processes. In further examples, the activator fluid can include the same activator compound that is used in the activator solution of such processes.

Some electroless plating processes use a single activator compound, while others use an activator and a co-activator, or multiple co-activators. In certain examples, the activator may be a catalyst and the co-activator may be a reducing agent or a sensitizer or an accelerator. In some such examples, the activator and co-activator can be included in separate solutions, or in some cases in a single solution. Thus, in some examples, the activator fluid described herein can include multiple chemical compounds such as an activator and a co-activator, together in the single activator fluid. In other examples, the activator and co-activator compounds can be separated into an activator fluid and a co-activator fluid.

In various examples, the electroless metal plating activator can include palladium, palladium chloride, tin, stannous chloride, nickel, copper, silver, cobalt, platinum, rhodium, iridium, osmium, ruthenium, or a combination thereof. In certain examples, the activator can be a metal salt made from any of the above-listed metals.

In further examples, an activator and co-activator can be included together in the activator fluid. In some examples, the co-activator can include palladium, palladium chloride, tin, stannous chloride, nickel, copper, silver, cobalt, platinum, rhodium, iridium, osmium, ruthenium, hydrochloric acid, formaldehyde, hydrazine, hydroxylamine, borohydride, or combinations thereof. Accordingly, a variety of combinations of activators and co-activators may be included in the activator fluid, depending on the chemistry of the particular electroless metal plating process being used.

The activator fluid can include additional components in addition to the electroless metal plating activator and/or co-activators. For example, the activator fluid can include a liquid vehicle with components selected for jettability of the fluid, such as dispersants, surfactants, cosolvents, and so on as described with respect to the other fluids. The activator fluid may also include other ingredients for promoting the chemical reaction of the activator and co-activator with the metal compound that is applied later to form the metal plating. In some examples, the activator fluid can include an acid or a base to adjust the pH of the fluid to promote the chemical reaction.

The activator and/or co-activators can be reacted with a metal compound to form metal plating. The metal compound can include atoms of the metal to be plated, and the metal compound can be reactive with the activator. This can include metal compounds that undergo reactions catalyzed by the activator. In certain examples, the metal compound can be present in an electroless metal plating solution and the 3D printed article can be placed or immersed in the electroless metal plating solution. The metal compound can react to produce metallic atoms that are deposited on the surface of the article to form metal plating. In certain examples, the electroless metal plating solution can include an additional chemical or chemicals that participate in the reaction. The activator and co-activator may act as a catalyst to cause the metal compound to react with the other chemicals in the solution to form the metal plating. In other examples, the activator or co-activator can react directly with the metal compound and can be consumed by the reaction instead of catalyzing the reaction.

In a particular example, the metal to be plated can be copper. In this example, the activator fluid can include palladium chloride as the electroless metal plating activator. The activator fluid can also include water and hydrochloric acid. In this example, a separate co-activator fluid can be used in conjunction with the activator fluid. The co-activator fluid in this example can include stannous chloride as the electroless metal plating co-activator. The co-activator fluid can also include water and hydrochloric acid. The stannous chloride can act as a reducing agent to reduce the palladium chloride, forming palladium that is active as a catalyst for copper plating. The metal compound added later to plate the copper into the 3D printed article can be $CuSO_4$. The metal compound can be present in a solution that includes other chemicals for reacting with the metal compound. The other chemicals in the solution of metal compound can include triethanolamine, diethanolamine, NaOH, methanol, and formaldehyde.

In further examples, the metal compound can be present in a solution that can include $CuSO_4$, triethanolamine, diethanolamine, NaOH, methanol, formaldehyde, hydrochloric acid, hydrazine, hydroxylamine, borohydride, potassium gold cyanide, citric acid, tetrasodium EDTA, ammonium hydroxide, sulfuring acid, fluoboric acid, $NiSO_4$, sodium hypophosphite, lead acetate, or combinations thereof.

Co-activator Fluids

As mentioned above, in some examples the electroless metal plating activator and co-activator can be in separate fluids. This may be the case when the activator and co-activator can react with one another and the reaction is not desired until the activator is on the article to be plated. The co-activator fluid can include any of the co-activator compounds mentioned above. In some examples, the co-activator fluid can include palladium, palladium chloride, tin, stannous chloride, nickel, copper, silver, cobalt, platinum, rhodium, iridium, osmium, ruthenium, hydrochloric acid, formaldehyde, hydrazine, hydroxylamine, borohydride, citric acid, tetrasodium EDTA, ammonium hydroxide, sulfuric acid, fluoboric acid, sodium hypophosphite, lead acetate, or combinations thereof. In further examples, the co-activator fluid can include other ingredients for jettability, such as a liquid vehicle, dispersants, surfactants, cosolvents, and so on as described with respect to the other fluids.

Detailing Fluids

The detailing fluid can include a detailing agent capable of cooling the polymer powder in portions of the powder bed onto which the detailing fluid is printed. In some examples, the detailing fluid can be printed around the edges of the portion of the powder that is printed with the fusible fluid. The detailing fluid can increase selectivity between the fused and unfused portions of the powder bed by reducing the temperature of the powder around the edges of the portion to be fused.

In some examples, the detailing agent can be a solvent that evaporates at the temperature of the powder bed. In some cases the powder bed can be preheated to a preheat temperature within about 10° C. to about 70° C. of the fusing temperature of the polymer powder. Depending on the type of polymer powder used, the preheat temperature can be in the range of about 90° C. to about 200° C. or more. Thus, the detailing agent can be a solvent that evaporates when it comes into contact with the powder bed at the preheat temperature, thereby cooling the printed portion of the powder bed through evaporative cooling. In certain examples, the detailing agent can include water, co-solvents, or combinations thereof. Non-limiting examples of co-solvents for use in the detailing fluid can include xylene, methyl isobutyl ketone, 3-methoxy-3-methyl-1-butyl acetate, ethyl acetate, butyl acetate, propylene glycol monomethyl ether, ethylene glycol mono tert-butyl Ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and combinations thereof. In some examples, the detailing fluid can be mostly water. In a particular example, the detailing fluid can be about 85 wt % water or more. In further examples, the detailing fluid can be about 95 wt % water or more. In still further examples, the detailing agent can be substantially devoid of radiation absorbers. That is, in some examples, the detailing agent can be substantially devoid of ingredients that absorb enough energy from the light source to cause the powder to fuse. In certain examples, the detailing fluid can include colorants such as dyes or pigments, but in small enough amounts that the colorants do not cause the powder printed with the detailing fluid to fuse when exposed to the light source.

The components of the above described fluids, e.g., fusible fluids, activator fluids, co-activator fluids, and detailing fluids, can be selected to give the respective fluids good fluid jetting performance and the ability to fuse the polymer bed material. Thus, these fluids can include a liquid vehicle. In some examples, the liquid vehicle formulation can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble radiation absorber can be used with an aqueous vehicle. Because the radiation absorber is dispersible or soluble in water, an organic co-solvent may not be present, as it may not be included to solubilize the radiation absorber. Therefore, in some examples the fluids can be substantially free of organic solvent, e.g., predominantly water. However, in other examples a co-solvent can be used to help disperse other dyes or pigments, or enhance the jetting properties of the respective fluids. In still further examples, a non-aqueous vehicle can be used with an organic-soluble or organic-dispersible fusing agent.

In certain examples, a high boiling point co-solvent can be included in the various fluids. The high boiling point co-solvent can be an organic co-solvent that boils at a temperature higher than the temperature of the powder bed during printing. In some examples, the high boiling point co-solvent can have a boiling point above about 250° C. In still further examples, the high boiling point co-solvent can be present in the various fluids at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from about 0.01 wt % to about 20 wt %. Suitable surfactants can include, but are not limited to, liponic esters such as Tergitol™ 15-S-12, Tergitol™ M 15-S-7 available from Dow Chemical Company (Michigan), LEG-1 and LEG-7; Triton™ X-100; Triton™ X-405 available from Dow Chemical Company (Michigan); and sodium dodecylsulfate.

Consistent with the formulations of this disclosure, as mentioned, various other additives can be employed to enhance certain properties of the fluid compositions for specific applications. Examples of these additives are those added to inhibit the growth of harmful microorganisms. These additives may be biocides, fungicides, and other microbial agents, which can be used in ink various formulations. Examples of suitable microbial agents include, but are not limited top NUOSEPT® (Nudex, Inc., New Jersey), UCARCIDE™ (Union carbide Corp., Texas), VANCIDE® (R.T. Vanderbilt Co., Connecticut), PROXEL® (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %.

Multi-fluid Kits for 3D Printing

Figure 11:
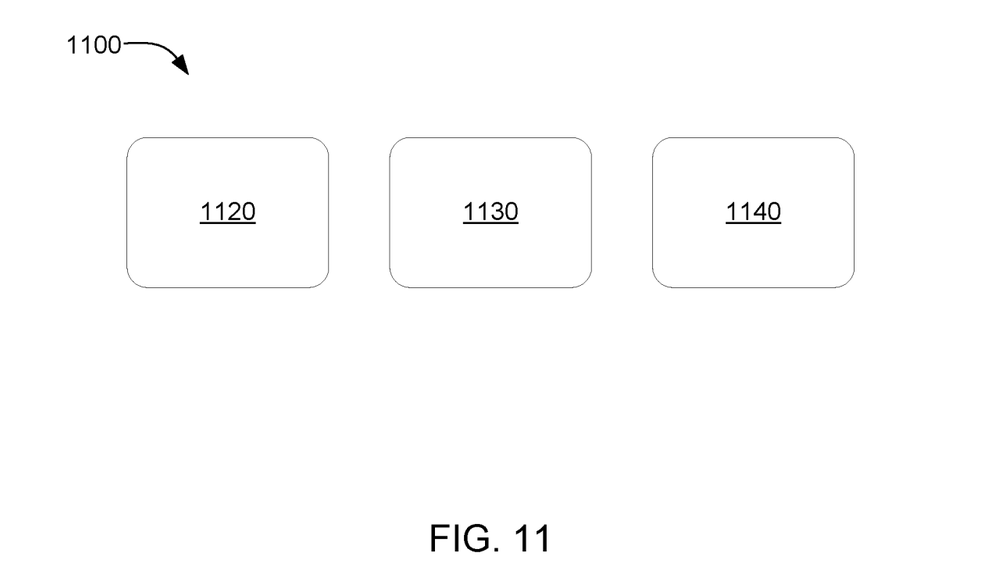
FIG. 11 is a schematic view of an example multi-fluid kit for 3D printing in accordance with the present disclosure.

The present disclosure also extends to multi-fluid kits for 3D printing. FIG. 11 shows a schematic view of a multi-fluid kit for 3D printing 1100. The multi-fluid kit includes a fusible fluid 1120, an activator fluid 1130, and a co-activator fluid 1140. As described above, in some examples the fusible fluid can include water and a radiation absorber. In certain examples, the radiation absorber can be carbon black, a near-infrared absorbing dye, a near-infrared absorbing pigment, a tungsten bronze, a molybdenum bronze, metal nanoparticles, a conjugated polymer, or a combination thereof. Additionally, the activator fluid can include an electroless metal plating activator. In some examples, the electroless metal plating activator can include palladium, palladium chloride, tin, stannous chloride, nickel, copper, silver, cobalt, platinum, rhodium, iridium, osmium, ruthenium, or a combination thereof. Further, the co-activator fluid can include an electroless metal plating co-activator. The electroless metal plating co-activator can be different than the electroless metal plating activator. In some examples, the electroless metal plating co-activator can include palladium, palladium chloride, tin, stannous chloride, nickel, copper, silver, cobalt, platinum, rhodium, iridium, osmium, ruthenium, hydrochloric acid, formaldehyde, hydrazine, hydroxylamine, borohydride, or a combination thereof. In further examples, the multi-fluid kit can also include a detailing fluid that includes a detailing agent. In other examples, the multi-fluid kit can also include an electroless plating solution that includes a metal compound that is reactive with the electroless metal plating activator to form metallic plating when the metal compound and the electroless metal plating activator are contacted within a fluid. In still further examples, the fluids in the multi-fluid kit can include any of the ingredients and properties described above. Additionally, the multi-fluid kits can be used to perform any of the methods of making 3D printed articles described above.

Definitions

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and can be determined based on experience and the associated description herein.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the Mastersizer™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, and also to include all the individual numerical values or sub-ranges encompassed within that range as if each numerical value and sub-range is explicitly recited. For example, a weight ratio range of about 1 wt % to about 20 wt % should be interpreted to include the explicitly recited limits of 1 wt % and about 20 wt %, and also to include individual weights such as 2 wt %, 11 wt %, 14 wt %, and sub-ranges such as 10 wt % to 20 wt %, 5 wt % to 15 wt %, etc.

As a further note, in the present disclosure, it is noted that when discussing the print media and methods described herein, each of these discussions can be considered applicable to each of these examples, whether or not they are explicitly discussed in the context of that example. Thus, for example, in discussing details about the methods of making 3D printed articles, such discussion also refers to the 3D printing kits, and vice versa.

Example

The following samples were formed using an HP Multi Jet Fusion® test bed. The powder bed material was a nylon-12 powder with a particle size ranging from about 10 µm to about 100 µm. The samples were formed by fusing together individual layers of polymer particles, with a layer height of about 70 µm to about 100 µm. The fusible fluid used in forming the samples was a black pigmented ink. Multiple rectangular areas of the surface of the samples were printed with an activator fluid including $PdCl_2$ and some samples were also printed with a co-activator fluid including $SnCl_2$. The activator fluid was a solution including palladium chloride, hydrochloric acid, and water (Caswell® Electroless Copper Activator, available from Caswell Inc., New York). The co-activator fluid was a solution including stannous chloride, hydrochloric acid, and water (Caswell® Electroless Copper Sensitizer, available from Caswell Inc., New York). In some samples the activator and co-activator were printed before fusing the surface layer of polymer particles, and in other samples the surface layer was fused before printing the activator and co-activator. The amount of activator and co-activator fluid printed was varied by changing the number of print passes used. Some of the samples were post-dipped in the activator ($PdCl_2$) fluid after printing the sample, and then rinsed in water. This post-dip was performed to determine whether additional Pd could complex with excess Sn on the surface. Some of the samples were subjected to various drying conditions, while others were not dried. After the samples were prepared in this way, the samples were dipped in a copper plating solution including copper sulfate, NaOH, methanol, formaldehyde, triethanolamine, and diethanolamine (Caswell® Electroless Copper Dip, available from Caswell Inc., New York). After dipping, the samples were rinsed with deionized water. Electrical resistance of the copper plated areas was then measured. The samples showed copper plated selectively in the areas where the activator and co-activator were printed. The specific conditions used for preparing each sample and the approximate order of magnitude of the electrical resistance measured on the copper-plated portion of each sample are listed in Table 1:

solutions because drying before dipping in the copper plating solution can interfere with plating. However, the test results surprisingly show that the high temperature fusing process and additional drying can be performed and then the parts can be successfully plated.

The durability of the copper plating was tested by adhering Kapton® polyimide tape (available from DuPont, Delaware) firmly to the surface and then lifting the tape off. No copper plating was removed by the tape. These results show

TABLE 1

Electroless Plated Samples

| Sample No. | $SnCl_2$ Applied? | No. of Print Passes ($SnCl_2/PdCl_2$) | Fused Before or After Applying $SnCl_2/PdCl_2$ | Post Dipped in $PdCl_2$? | Dried? | Resistance |
|---|---|---|---|---|---|---|
| 1 | No | 0/1 | After | No | No | No conductivity |
| 2 | Yes | 1/1 | After | No | No | No conductivity |
| 3 | Yes | 5/5 pass equiv. | After | No | No | ~kΩ |
| 4 | Yes | Blanket re-dip of Sample 2 | Re-dipped and plated Sample 2 | Yes | Sample 2 sat in fume hood overnight | ~Ω |
| 5 | Yes | 2/2 | Before | No | No | ~Ω to ~kΩ |
| 6 | Yes | 1/1 | After | Yes | No | ~Ω |
| 7 | Yes | 2/2 | After | No | No | ~kΩ |
| 8 | Yes | 2/2 | After | No | 1 hr at 80° C. | ~MΩ |
| 9 | Yes | 2/2 | After | Yes | 1 hr at 80° C. then ambient overnight | ~Ω |
| 10 | No | 0/5 | Before | No | No | ~kΩ |
| 11 | No | 0/5 | After | No | 15 min at 80° C. then ambient 6 days | <1Ω |
| 12 | Yes | 2/2 | After | No | Ambient overnight | ~kΩ |

Sample 3 was printed using a different jetting architecture for jetting the activator fluid and co-activator fluid. A single pass of the activator and co-activator was printed in Sample 3, but the jetting architecture printed droplets of 5 times the volume as in the other samples. Therefore, this single pass was equivalent to 5 passes with the other jetting architecture.

Sample 4 was actually a re-test of Sample 2 after dipping Sample 2 in the activator and co-activator fluids and rinsing, then plating again using the copper plating solution. Unexpectedly, the original patterning of Sample 2 was plated with copper even though the entire part had been blanket dipped in the activator and co-activator, indicating that some activator or co-activator was present from the original printing to cause the copper to preferentially plate in the printed areas.

Sample 8 had a resistance on the order of several MΩ. This sample was subsequently dipped in 1 molar HCl, rinsed, and then dipped a second time in the copper plating solution. After the second dip, the resistance of Sample 8 was reduced to a few Ω.

In Sample 12, a surfactant TERGITOL® TMN6 (available from Dow Chemical Company, Michigan) was added to the activator fluid and the co-activator fluid. The surfactant did not interfere with the electroless plating.

The instructions provided by Caswell for electroless plating state not to dry a part dipped in the $PdCl_2$ and $SnCl_2$ that the activator and co-activator jetted during 3D printing allow for selective deposition of durable electroless metal plating.

What has been described and illustrated herein is an example of the disclosure along with some of its variations. The terms, descriptions, and figures used herein are set forth by way of illustration and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A 3D printing kit comprising:
    a powder bed material comprising polymer particles;
    a fusible fluid comprising a radiation absorber to selectively apply to the powder bed material; and
    an activator fluid comprising a non-conductive electroless metal plating activator to selectively apply to the powder bed material.

2. A 3D printing kit of claim 1, wherein the polymer particles have an average particle size from about 20 μm to about 100 μm and include nylon 6, nylon 9, nylon 11, nylon 12, nylon 66, nylon 612, polyethylene, thermoplastic polyurethane, polypropylene, polyester, polycarbonate, polyether ketone, polyacrylate, polystyrene powder, wax, or a combination thereof.

3. A 3D printing kit of claim 1, wherein the radiation absorber is carbon black, a near-infrared absorbing dye, a near-infrared absorbing pigment, a tungsten bronze, a molybdenum bronze, metal nanoparticles, a conjugated polymer, or a combination thereof.

4. The 3D printing kit of claim 1, wherein the non-conductive electroless metal plating activator comprises palladium, palladium chloride, tin, stannous chloride, nickel, copper, silver, cobalt, platinum, rhodium, iridium, osmium, ruthenium, or a combination thereof.

5. The 3D printing kit of claim 1, further comprising a detailing fluid comprising a detailing agent to selectively apply to the powder bed material.

6. The 3D printing kit of claim 1, further comprising a metal compound that is reactive with the electroless metal plating activator to form metallic plating when the metal compound and the electroless metal plating activator are contacted within a fluid.

7. A 3D printing kit comprising:
a powder bed material comprising polymer particles;
a fusible fluid comprising a radiation absorber to selectively apply to the powder bed material;
an activator fluid comprising an electroless metal plating activator to selectively apply to the powder bed material; and
a co-activator fluid comprising an electroless metal plating co-activator to selectively apply to the powder bed material, wherein the electroless metal plating co-activator is different than the electroless metal plating activator.

8. The 3D printing kit of claim 7, wherein the electroless metal plating activator comprises palladium, palladium chloride, tin, stannous chloride, nickel, copper, silver, cobalt, platinum, rhodium, iridium, osmium, ruthenium, or a combination thereof.

9. The 3D printing kit of claim 7, wherein the electroless metal plating co-activator comprises palladium, palladium chloride, tin, stannous chloride, nickel, copper, silver, cobalt, platinum, rhodium, iridium, osmium, ruthenium, hydrochloric acid, formaldehyde, hydrazine, hydroxylamine, borohydride, or a combination thereof.

10. The 3D printing kit of claim 7, further comprising a metal compound that is reactive with the electroless metal plating activator, the electroless metal plating co-activator, or both to form metallic plating when contacted within a fluid.

11. A method of making a 3D printed article comprising:
iteratively applying individual build material layers of polymer particles to a powder bed;
based on a 3D object model, selectively jetting a fusible fluid onto individual build material layers, wherein the fusible fluid comprises a radiation absorber;
jetting an activator fluid onto an area of the individual build material layers at a surface of the 3D printed article to form an area to be plated, wherein the activator fluid comprises an electroless metal plating activator; and
exposing the powder bed to energy to selectively fuse the polymer particles in contact with the radiation absorber at individual build material layers.

12. The method of claim 11, further comprising contacting the area to be plated with a fluid comprising a metal compound, wherein the metal compound reacts with the electroless metal plating activator to form metallic plating over the area to be plated.

13. The method of claim 12, further comprising plating additional metal onto the area to be plated by galvanic plating.

14. The method of claim 12, wherein the 3D printed article comprises a mold which includes a 3D printed base having the metallic plating applied to a surface of the 3D printed base.

15. The method of claim 12, wherein the 3D printed article is included in a joint which comprises a 3D printed ball or socket having the metallic plating applied to a surface of the 3D printed ball or socket.

16. The method of claim 12, wherein the 3D printed article includes an enclosure portion and the metallic plating is applied within the enclosure portion.

17. A multi-fluid kit for 3D printing comprising:
a fusible fluid comprising water and a radiation absorber;
an activator fluid comprising an electroless metal plating activator; and
a co-activator fluid comprising an electroless metal plating co-activator, wherein the electroless metal plating co-activator is different than the electroless metal plating activator.

18. The multi-fluid kit of claim 17, wherein the electroless metal plating activator comprises palladium, palladium chloride, tin, stannous chloride, nickel, copper, silver, cobalt, platinum, rhodium, iridium, osmium, ruthenium, or a combination thereof, and wherein the electroless metal plating co-activator comprises palladium, palladium chloride, tin, stannous chloride, nickel, copper, silver, cobalt, platinum, rhodium, iridium, osmium, ruthenium, hydrochloric acid, formaldehyde, hydrazine, hydroxylamine, borohydride, or a combination thereof.

19. The multi-fluid kit of claim 17, further comprising a detailing fluid comprising a detailing agent.

20. The multi-fluid kit of claim 17, further comprising an electroless plating solution comprising a metal compound that is reactive with the electroless metal plating activator to form metallic plating when the metal compound and the electroless metal plating activator are contacted within a fluid.

* * * * *